US009417315B2

(12) United States Patent
Palmer et al.

(10) Patent No.: US 9,417,315 B2

(45) Date of Patent: Aug. 16, 2016

(54) RADAR SYSTEM AND METHODS FOR MAKING AND USING SAME

(71) Applicant: The Board of Regents of the University of Oklahoma, Norman, OK (US)

(72) Inventors: Robert Dean Palmer, Norman, OK (US); Redmond Clay Kelley, Norman, OK (US); Boon Leng Cheong, Norman, OK (US); Yan Zhang, Norman, OK (US)

(73) Assignee: The Board of Regents of the University of Oklahoma, Norman, OK (US)

( * ) Notice: Subject to any disclaimer, the term of this patent is extended or adjusted under 35 U.S.C. 154(b) by 201 days.

(21) Appl. No.: 14/137,355

(22) Filed: Dec. 20, 2013

(65) Prior Publication Data

US 2014/0292563 A1 Oct. 2, 2014

Related U.S. Application Data

(60) Provisional application No. 61/740,191, filed on Dec. 20, 2012.

(51) Int. Cl.

*G01S 7/28* (2006.01)
*G01S 7/03* (2006.01)

(Continued)

(52) U.S. Cl.

CPC . *G01S 7/28* (2013.01); *G01S 7/032* (2013.01); *G01S 13/95* (2013.01)

(58) Field of Classification Search

CPC ............. G01S 7/02; G01S 7/03; G01S 7/032; G01S 7/28; G01S 13/88; G01S 13/95; G01S 3/02; G01S 3/14; G01S 3/46; G01S 3/48; G01S 7/282; G01S 7/285; G01S 13/02; G01S 13/06; G01S 13/08; G01S 13/10; G01S 13/26; G01S 13/28; G01S 13/284; G01S 13/288; G01S 13/32; G01S 13/34; G01S 13/343; G01S 13/345; G01S 13/50; G01S 13/58; G01S 13/585; G01S 13/586; G01S 13/64; G01S 13/74; G01S 13/82; G01S 13/84; H01Q 3/26; H01Q 3/30; H04B 7/00; H04B 7/01; H03L 7/06; H03L 7/08; H03L 7/085; H03L 7/16; H03L 7/22

USPC .......... 342/26 R–26 D, 82–103, 175, 195, 13, 342/16, 17, 118, 125, 128–135; 323/220, 323/232

See application file for complete search history.

(56) References Cited

U.S. PATENT DOCUMENTS 3,287,725 A * 11/1966 Webb .................... G01S 13/586 342/103
3,530,467 A * 9/1970 Attwood ................. G01S 13/82 342/102

(Continued)

OTHER PUBLICATIONS

Ventura, Jordi Figueras I, Design of a High Resolution X-band Doppler Polarimetric Weather Radar, Oct. 8, 2009.

*Primary Examiner* — Bernarr Gregory

(74) *Attorney, Agent, or Firm* — Dunlap Codding, P.C.

(57) ABSTRACT

A transmitter front end circuit is described. The transmitter front end circuit is provided with a radar transmitter port, a radar receiver port, a radar amplifier, a coupler, a radar antenna input and a signal director. The radar amplifier has a low power side receiving a transmit signal having a transmit waveform modulated onto a carrier frequency from the radar transmitter port, and a high power side outputting an amplified transmit waveform suitable for transmission to a radar antenna. The coupler is coupled to the high power side of the radar amplifier to sample the amplified transmit waveform. The radar antenna input is configured to receive return signals from a radar antenna. And, the signal director selectively directs the sample of the amplified transmit waveform and the return signals to the radar receiver port.

18 Claims, 7 Drawing Sheets

(51) Int. Cl.

| | |
|---|---|
| ***G01S 13/95*** | (2006.01) |
| *G01S 7/00* | (2006.01) |
| *G01S 13/00* | (2006.01) |

(56) References Cited

U.S. PATENT DOCUMENTS 3,707,718 A * 12/1972 Ames ........................ G01S 13/64 342/100
3,729,736 A * 4/1973 Fletcher .................. G01S 13/84 342/103
3,769,589 A * 10/1973 Buntschuh ................ H03L 7/22 342/100
3,860,921 A * 1/1975 Fletcher .................. G01S 13/84 342/125
3,878,522 A * 4/1975 Gurak ........................ H03L 7/06 342/99
3,883,872 A * 5/1975 Fletcher .................. H04B 7/00 342/89
3,950,751 A * 4/1976 Orr ........................ G01S 13/586 342/17
4,159,475 A * 6/1979 Andre ........................ H03L 7/06 342/103
4,241,345 A 12/1980 Johnson
4,249,174 A 2/1981 Lucchi et al.
4,521,747 A 6/1985 Tahim et al.
4,591,859 A 5/1986 Campbell
4,660,040 A * 4/1987 Grandos ............... G01S 13/345 342/128
4,758,839 A * 7/1988 Goebel ................. G01S 13/288 342/132
4,870,421 A 9/1989 Peil et al.
4,901,082 A 2/1990 Schreiber et al.
5,063,387 A * 11/1991 Mower ..................... H04B 7/01 342/103
5,210,539 A * 5/1993 Voyce ................... G01S 13/343 342/83
5,274,380 A * 12/1993 Yatsuka ................ G01S 13/345 342/100
5,377,090 A 12/1994 Steigerwald
5,945,941 A * 8/1999 Rich, III ................. G01S 7/282 342/175
5,973,636 A 10/1999 Okubo et al.
6,067,241 A 5/2000 Lu
6,125,266 A 9/2000 Matero et al.
6,426,680 B1 7/2002 Duncan et al.
6,445,339 B1 * 9/2002 Yamada ................ G01S 13/345 342/195
6,573,859 B2 * 6/2003 Tokoro .................. G01S 13/345 342/128
6,771,052 B2 8/2004 Ostojic
6,856,283 B2 * 2/2005 Jacobson ................ G01S 7/282 342/175
6,873,138 B2 * 3/2005 Jacobson ................. H01Q 3/30 323/232
6,963,302 B2 * 11/2005 Arvidsson ............... G01S 7/282 342/175
7,092,043 B2 8/2006 Vorenkamp et al.
7,236,212 B2 6/2007 Carr et al.
7,345,378 B2 3/2008 Pearce
7,423,699 B2 9/2008 Vorenkamp et al.
7,474,257 B2 1/2009 Blunt et al.
7,583,222 B2 9/2009 O'Hara et al.
7,663,537 B2 * 2/2010 Suzuki .................... G01S 13/34 342/175
7,688,255 B2 * 3/2010 Suzuki .................. G01S 13/345 342/128
7,830,986 B1 * 11/2010 Gaither ................... H03L 7/085 342/103
7,898,460 B2 * 3/2011 Nishimura ................ G01S 3/48 342/128
8,045,066 B2 10/2011 Vorenkamp et al.
8,049,663 B2 11/2011 Frank et al.
8,193,972 B2 6/2012 Hofele
9,013,346 B2 * 4/2015 Nettelbland ............ G01S 7/282 342/175
2008/0150819 A1 6/2008 Uno et al.
2010/0097045 A1 4/2010 Chen

* cited by examiner

RADAR SYSTEM AND METHODS FOR MAKING AND USING SAME

INCORPORATION BY REFERENCE OF RELATED APPLICATION

The present disclosure hereby incorporates by reference the entire provisional patent application filed on Dec. 20, 2012 and identified by U.S. Application No. 61/749,191.

BACKGROUND

In certain embodiments, the present disclosure relates to a pulsed radar system, and more particularly but not by way of limitation, to a pulsed radar system in which an amplified transmit waveform is sampled on a high-power side of a radar amplifier and fed back to a computer system and used to interpret return signals indicative of echoes from a microwave radiation created by the amplified transmit waveform.

As background, pulsed radar systems are well known in the art and can be used as weather radar. Weather radar, also called weather surveillance radar (WSR) and Doppler weather radar, is a type of radar used to locate precipitation, calculate its motion, and estimate its type (rain, snow, hail, etc.). Modern weather radars are mostly pulse-Doppler radars, capable of detecting the motion of precipitation (rain, snow, hail, etc.) in addition to the intensity of the precipitation. Both types of data can be analyzed to determine the structure of storms and their potential to cause severe weather.

A pulsed radar system has a transmit mode and a receive mode. In the transmit mode, a transmit signal is directed to a radar amplifier which amplifies the transmit signal and directs the amplified transmit signal to a radar antenna. The radar antenna converts the amplified transmit signal into microwaves directed into the atmosphere. After the transmit mode, the pulsed radar system automatically switches to a receive mode in which the pulsed radar system uses the radar antenna to listen for echoes in the atmosphere due to the transmission of the transmit signal. The pulsed radar system interprets the echoes into return signals and then interprets the return signals into a graphical display showing features such as clouds, rain drops, or the like that are present within the atmosphere.

Sensitivity of the pulsed radar system is an important aspect in determining power requirements and effective distance of the pulsed radar system. One manner to increase the sensitivity of the pulsed radar system is to improve the ability to interpret the return signals into the features present within the atmosphere. By increasing the pulsed radar systems ability to interpret the return signals into the features present within the atmosphere, the power requirements and the effective distance of the pulsed radar system can be improved. It is to such an improved pulsed radar system that the present disclosure is directed.

BRIEF DESCRIPTION OF THE DRAWINGS

Implementations of the inventive concepts disclosed herein may be better understood when consideration is given to the following detailed description thereof. Such description makes reference to the annexed pictorial illustrations, schematics, graphs, figures, or drawings. The drawings are not necessarily to scale, and certain features and certain views of the drawings may be shown exaggerated, to scale, or in schematic in the interest of clarity and conciseness. Like reference numerals in the figures may represent and refer to the same or similar element or function. In the drawings.

DETAILED DESCRIPTION

Figure 1:
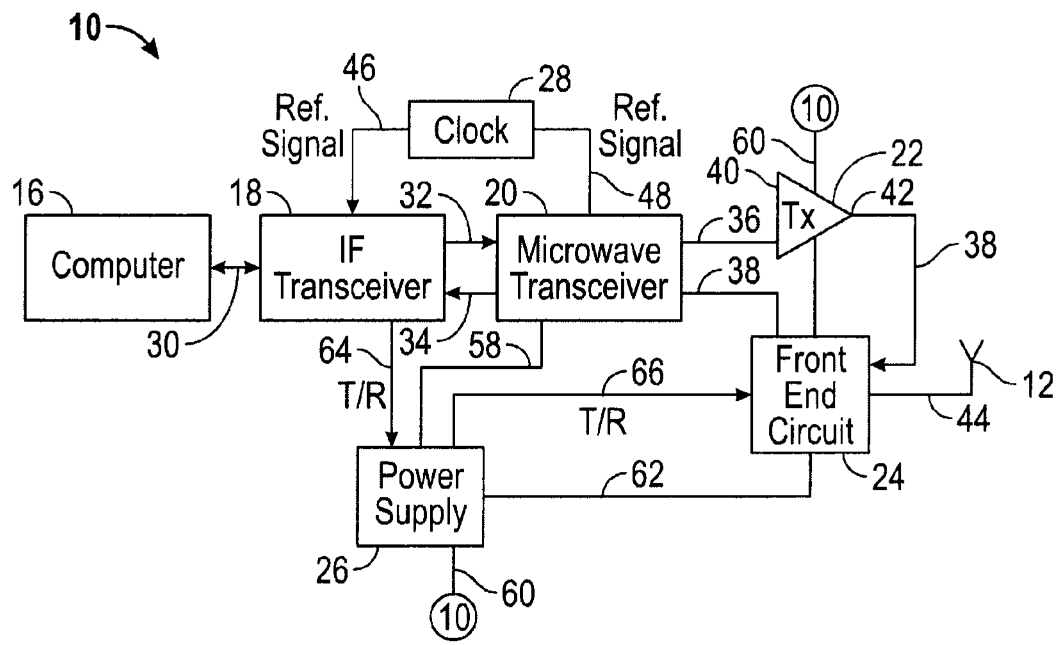
FIG. 1 is a block diagram of a radar system constructed in accordance with the present disclosure.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. The inventive concepts disclosed herein are capable of other embodiments or of being practiced or carried out in various ways. Also, it is to be understood that the phraseology and terminology employed herein is for the purpose of description and should not be regarded as limiting the inventive concepts disclosed and claimed herein in any way.

In the following detailed description of embodiments of the inventive concepts, numerous specific details are set forth in order to provide a more thorough understanding of the inventive concepts. However, it will be apparent to one of ordinary skill in the art that the inventive concepts within the disclosure may be practiced without these specific details. In other instances, well-known features have not been described in detail to avoid unnecessarily complicating the instant disclosure.

As used herein, the terms “comprises,” “comprising,” “includes,” “including,” “has,” “having” or any other variation thereof, are intended to cover a non-exclusive inclusion. For example, a process, method, article, or apparatus that comprises a list of elements is not necessarily limited to only those elements but may include other elements not expressly listed or inherently present therein.

Unless expressly stated to the contrary, “or” refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concepts. This description should be read to include one or at least one and the singular also includes the plural unless it is obvious that it is meant otherwise.

Further, as used herein any reference to "one embodiment," "an embodiment, "some embodiments," or "certain embodiments" means that a particular element, feature, structure, or characteristic described in connection with the embodiment is included in at least one or more embodiments. The appearances of the phrase "in one embodiment" in various places in the specification are not necessarily all referring to the same embodiment and may refer to other embodiments as well.

Finally, as used herein qualifiers such as "about," "approximately," and "substantially" are intended to signify that the item being qualified is not limited to the exact value specified, but includes some slight variations or deviations therefrom, caused by measuring error, manufacturing tolerances, stress exerted on various parts, wear and tear, and combinations thereof, for example.

Referring now to FIG. 1, shown therein and designated by reference numeral 10 is a radar system constructed in accordance with the present disclosure. In particular, the radar system 10 may utilize a pulsed architecture, operate at an X-band frequency and be designed and built for advanced solid-state weather radars. However, it should be understood that the radar system 10 can operate at different frequencies and be used for purposes other than weather radar. As will be described below, the radar system 10 may utilize a unique front-end architecture that allows for an amplified transmit waveform to be monitored in real time. In particular, the radar system 10 may utilize a pulsed architecture in which a series of pulses including the amplified transmit waveform is directed to a radar antenna 12 followed by a waiting period where echoes are received by the radar antenna 12 and converted into return signals. The front-end architecture may allow for the amplified transmit waveform in every pulse to be monitored in real time, demodulated from a carrier frequency and fed back to a computer and used as feedback to interpret return signals that have also been demodulated from the carrier frequency. The front-end architecture enhances the sensitivity of the radar system 10 and thereby permits a range of the radar system 10 to be increased while also decreasing power requirements to obtain such range.

In one embodiment, the radar system 10 is provided with one or more computer system 16, one or more intermediate frequency transceiver 18 (hereinafter referred to as "IF transceiver 18"), one or more microwave transceiver 20 (hereinafter referred to as "microwave transceiver 20"), one or more radar amplifier 22 (hereinafter referred to as "radar amplifier 22"), one or more front-end circuit 24 (hereinafter referred to as "front-end circuit 24"), one or more power supply 26 (hereinafter referred to as "power supply 26") and one or more clock 28 (hereinafter referred to as "clock 28"). In accordance with the present disclosure, the radar amplifier 22 may have a relatively low power capacity compared to other radar amplifiers. For example, the radar amplifier 22 may have a power capacity of approximately 100 Watts while still having a long-range of monitoring ability of approximately 60 Kilometers from the radar antenna 12.

The computer system 16 is coupled to the IF transceiver 18 via a communication link 30 which may be in the form of a cable, for example to permit bidirectional communication between the computer system 16 and the IF transceiver 18. The IF transceiver 18 is coupled to the microwave transceiver 20 by communication links 32 and 34 to permit bidirectional communication therebetween. In particular, the IF transceiver 18 directs a transmit signal to the microwave transceiver 20 via the communication link 32 and the microwave transceiver 20 directs demodulated return signals to the IF transceiver 18 via the communication link 34. Although the communication links 32 and 34 are shown separately, it should be understood that the communication links 32 and 34 may be on a single physical communication link bundle. For example, communication links 32 and 34 can be one or more cables. The microwave transceiver 20 is coupled to the radar amplifier 22 via a communication link 36, which may be a cable, and is also coupled to the front-end circuitry 24 via a communication link 38. The radar amplifier 22 is provided with a low power side 40 configured to receive transmit signals from the communication link 36 and a high power side 42 configured to provide the amplified transmit waveform onto the communication link 38. The front end circuit 24 receives the amplified transmit waveform, and then directs the amplified transmit waveform to the radar antenna 12 via a communication link 44. The front end circuit 24 also directs the transmit signals during transmit cycle (high at 79-1, 79-2, and 79-3 in FIG. 3) to the microwave transceiver 20 via link 38 and subsequently IF transceiver 18 via link 34 to sample the transmit waveform. Otherwise, the front end circuit 24 directs the receive signal (low at 94, 96, and 98 in FIG. 3) from the antenna 12 to the microwave transceiver 20. The communication links 38 and 44 may be cable(s) or any other suitable electrical conductor(s).

The clock 28 is coupled to the IF transceiver 18 and the microwave transceiver 20 via communication links 46 and 48 and serves to provide reference signals for synchronizing the IF transceiver 18 and the microwave transceiver 20. The communication links 46 and 48 may be cables or any other suitable electrical conductor(s). The power supply 26 may provide power to the various components within the radar system 10 as well as various control signals as well. For example, as shown in FIG. 1, the power supply 26 supplies power to the microwave transceiver 20, the radar amplifier 22, and the front end circuit 24 via power lines 58, 60, and 62. Further, the power supply 26 is configured to receive a transmit/receive logic signal from the IF transceiver 18 via a communication link 64 and to direct the transmit/receive logic signal to the front end circuit 24 via a communication link 66.

Figure 2:
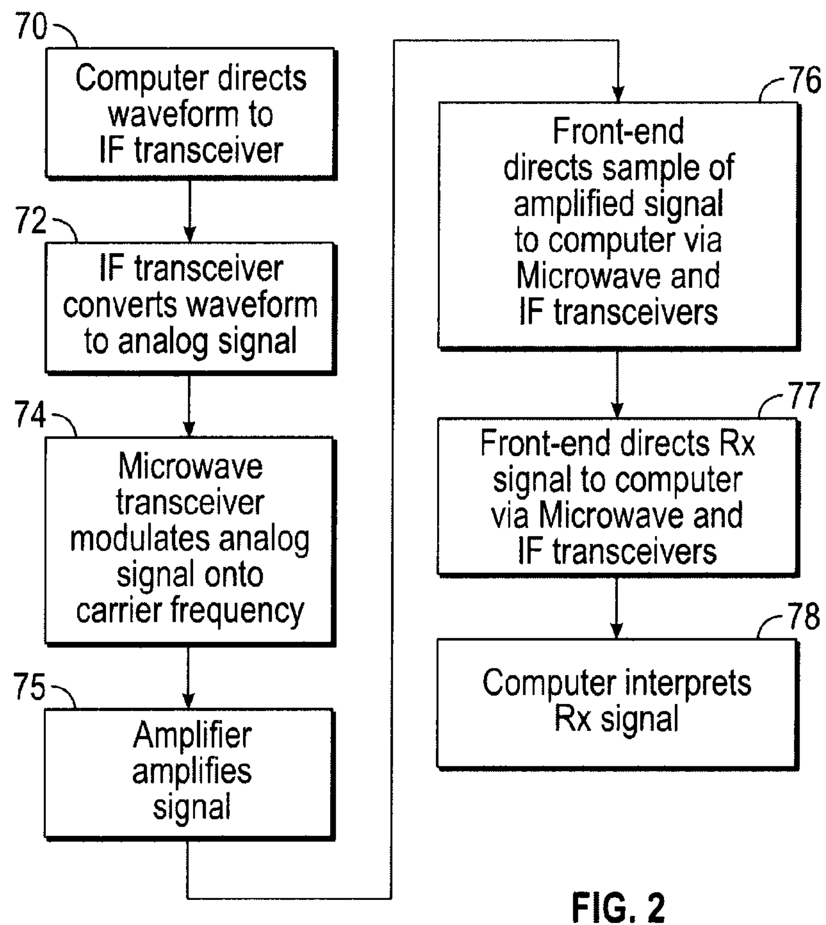
FIG. 2 is a logic flow diagram of sequential transmit and receive modes of the radar system depicted in FIG. 1.

Referring now to FIG. 2, shown therein is an exemplary logic flow diagram illustrating the functionality of the radar system 10 during a single pulse cycle. In general, prior to pulsing cycles, the transmit waveform are loaded to a wave table of the IF transceiver 20. At each pulse cycle, the transmit waveform is converted into analog forms as indicated by a block 72. In this example, the transmit pulse is in a digital format where the transmit waveform is implemented as a series of numbers which can be interpreted by a predetermined time sequence algorithm. The IF transceiver 18 receives the transmit pulse having the transmit waveform from the computer system 16 and then processes the transmit pulse with a predetermined time sequence algorithm to convert the series of numbers into an analog waveform as indicated by block 72. The IF transceiver 18 directs the analog waveform to the microwave transceiver 20 via the communication link 32, and also directs a transmit/receive signal to the power supply 26. The direction of the analog waveform and the transmit/receive signal is synchronized such that the amplified transmit waveform is sampled and fed back to the computer system 16 followed by the return signals as discussed above.

As indicated by the block 74, the microwave transceiver 20 receives the transmit signal in the form of the analog waveform and then modulates the analog waveform onto a carrier frequency to generate a transmit signal. The microwave transceiver 20 directs the transmit signal to the radar amplifier 22 via the communication link 36 as indicated by the block 75 whereby the radar amplifier 22 amplifies the transmit signal to form the amplified transmit waveform discussed above. The radar amplifier 22 may have any suitable gain and may operate in a nonlinear range, for example. Then, as indicated by block 76, the front end circuit 24 receives the amplified transmit waveform and the transmit/receive logic signal and then samples the amplified transmit waveform while also directing the amplified transmit waveform to the radar antenna 12 via the communication link 44. As indicated by the block 77, the sample of the amplified transmit waveform and the return signals are then directed to the computer system 16 by way of the communication links 38, 34, and 30 and the microwave transceiver 20 and the IF transceiver 18 where the sample of the amplified transmit waveform and the return signals are demodulated and converted from the analog form to a digital form. In other words, upon receipt of the sample of the amplified transmit waveform and the return signals, the microwave transceiver 20 demodulates the sample to remove the carrier frequency to form an analog waveform which is then converted into a digital waveform (i.e., series of numbers) by the IF transceiver 18.

Figure 6:
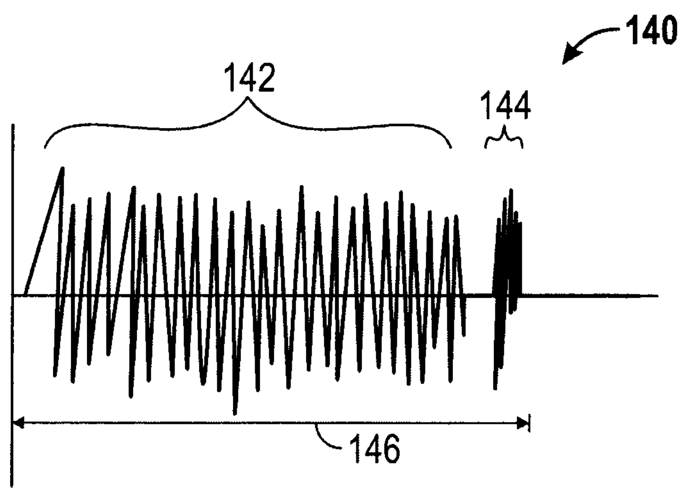
FIG. 6 shows an exemplary waveform of a transmit pulse having a long waveform and a short waveform in accordance with the present disclosure.

Thereafter, as indicated by a block 78, the computer system 16 match filters the demodulated return signals with the demodulated sample of the amplified transmit waveform and then processes a radar signal having information generated by the match filtering of the demodulated return signals with the demodulated sample of the amplified transmit waveform with a radar processing algorithm to convert the information into meteorological data showing one or more features within the earth's atmosphere. Shown in FIG. 6 is an exemplary transmit waveform 70 which may be generated by the computer system 16 and directed to the IF transceiver 18.

Figure 3:
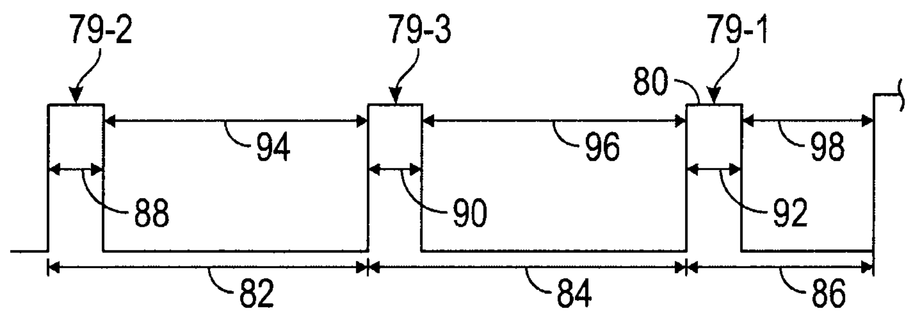
FIG. 3 is a waveform illustrating an exemplary duty cycle of sequential transmit and receive modes of the radar system depicted in FIG. 1.

Referring now to FIG. 3, shown therein is an exemplary pulse train 79-1 emitted by the computer system 16 in accordance with certain aspects of the present disclosure. The pulse train 79-1 may have a duty cycle in a range from about 1% to about 15%. In one embodiment, the duty cycle of the pulse train 79-1 is 13%. The pulse train 79-1 includes many pulses with three pulses 79-2, 79-3, and 80 having three separate periods 82, 84 and 86 being shown by way of example. Each of the pulses 79-2, 79-3, and 80 is provided with a transmit portion 88, 90 and 92 and a receive portion 94, 96 and 98. The transmit signal discussed above is transmitted from the computer system 16 to the IF transceiver 18 during the transmit portion 88, 90 and 92 of the pulses 79-2, 79-3, and 80. During the receive portions 94, 96 and 98, the computer system 16 receives the demodulated return signals from the IF transceiver 18.

Figure 4:
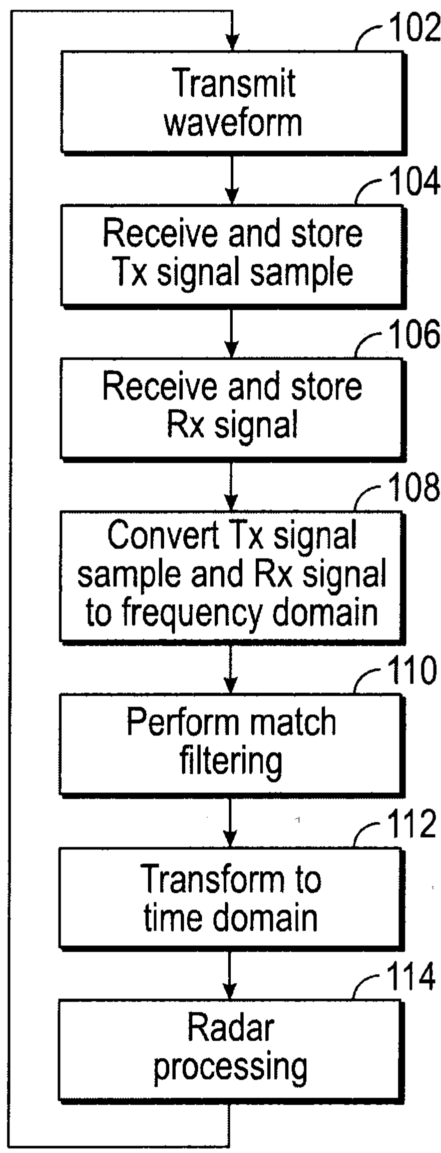
FIG. 4 is a logic flow diagram of a signal interpretation algorithm executed by a computer system of the radar system set forth in FIG. 1 in accordance with the present disclosure.

Referring now to FIG. 4, shown therein is a flowchart of an exemplary radar transmit/receive algorithm 100 constructed in accordance with certain aspects of the inventive concepts for transmitting the transmit signal, receiving the return signals, and interpreting the return signals during the pulse 79-2 of the pulse train 79-1. In particular, the transmit/receive algorithm 100 branches to a step 102 where the transmit signal is generated and transmitted to the IF transceiver 18. Then, the computer system 16 branches to a step 104 to receive and store the demodulated sample of the amplified transmit waveform. The algorithm 100 then branches to a step 106 where the computer system 16 receives and stores the demodulated return signals received during the receive portion 94 of the pulse 79-2. The demodulated sample of the amplified transmit waveform and the demodulated return signals are in the time domain when such signals are received and stored by the computer system 16. In order to achieve real-time processing with long match filters, the algorithm 100 branches to a step 108 in which the sample of the amplified transmit waveform and the return signals are converted to the frequency domain utilizing any suitable algorithm such as the Fourier transform.

Then, the algorithm 100 branches to a step 110 to perform match filtering of the demodulated return signals with the demodulated sample of the amplified transmit waveform to remove any distortion or other irregularities from the demodulated return signals. The resulting signal may then be transformed to the time domain as indicated by a step 112 and the time domain signal may then be directed to a radar processing algorithm 113 at a step 114 to interpret the time domain signal such as by generating a video meteorological plot of the information contained within the time domain signal. The algorithm 100 then branches back to the step 102 for each of the subsequent pulses 79-3 and 80, for example. Collectively, the information within the time domain signals collected during each pulse may be used to form a video signal indicative of features located by the radar system 10 in the earth's atmosphere.

Figure 5:
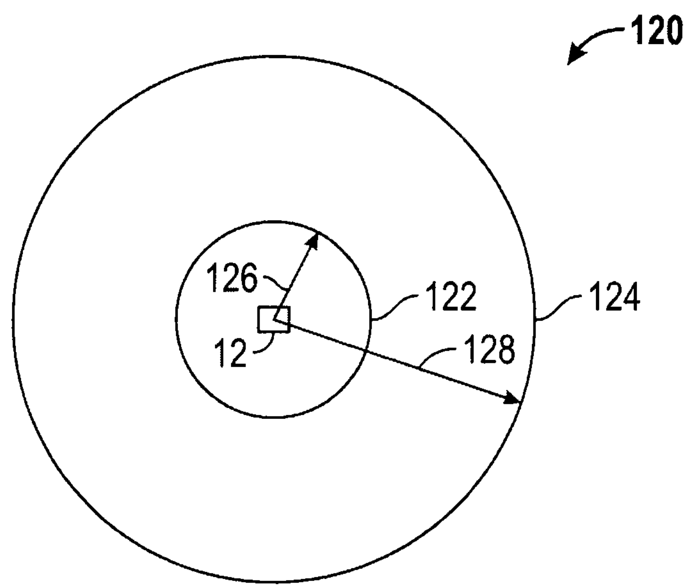
FIG. 5 is a top plan view of a geographic area scanned by the radar system depicted in FIG. 1 in which the geographic area is divided into a blind range and a long-range outside of and surrounding the blind range.

Referring now to FIG. 5, shown therein is a portion 120 of the earth's atmosphere surrounding the radar antenna 12. The portion 120 of the earth's atmosphere can be divided into at least two separate areas that are known in the art as a blind range 122 and a long-range 124. The blind range 122 surrounds the radar antenna 12 and is immediately adjacent to the radar antenna 12. The blind range 122 has a radius 126 which may vary but can be about 10 km in length. The long-range 124 surrounds the blind range 122 and has a radius 128 which may be 60 km in length for example. As one skilled in the art would understand, the size of the radii 126 and 128 can vary depending upon the length of the waveform 140 as well as the geography surrounding the radar antenna 12.

In any event, features within the blind range 122 typically cannot be detected by radar due to the fact that signals transmitted by the radar amplifier 22 are much stronger than the echoes formed by the microwaves contacting precipitation and generally overwhelm the echoes. However, features within the long-range 124 may be detected by the radar system 10.

In accordance with the present disclosure, the radar system 10 is designed to detect features within the blind range 122 and the long-range 124. This is accomplished by utilizing a particular configuration of the transmit waveform generated by the computer system 16 as well as the manner in which the demodulated return signals are interpreted. An example of a transmit waveform 140 suitable for locating features within the blind range 122 and a long-range 124 is shown. The transmit waveform 140 may include a long waveform 142 and a short waveform 144 occupying separate periods in a time domain 146. The long waveform 142 may be provided with a length of approximately 65 to 69 μs while the short waveform 144 may be provided with a length of approximately 1 to 2 μs. In this regard, the long waveform 142 may be at least 20-30 times the length of the short waveform 144. It should also be understood that in this example, the short waveform 144 follows after the long waveform 142 to permit recovery of the blind range 122. Further, this technique can be extended to allow the transmit waveform 140 to include more than two waveforms ordered from the longest to the shortest. The long waveform 142 and the short waveform 144 may be implemented as single tone waveform having a single frequency, or multi-tone waveforms having more than a single frequency. For instance, the long waveform 142 and the short waveform 144 may span two frequency bands, for example, in the X-band the long waveform 142 and the short waveform 144 may span a 5-MHz band in between 8.0 and 12.0 GHz. The multi-tone waveform may be produced as a single waveform, or may be constructed with a sequencer which may produce cycles at different frequencies in discrete segments during a given time frame. Where the multi-tone waveform is implemented as a group of cycles, the waveform length may be chosen so that the waveforms cycles within the time frame have an integer number. The long waveform 142 is used by the computer system 16 to locate features in the long-range 124 while the short waveform 144 is used to locate features in the blind range 122.

In certain embodiments, the demodulated sample of the amplified transmit waveform will include features of both the long waveform 142 and the short waveform 144. In addition, the demodulated return signals received by the computer system 16 will also include features of both the long waveform 142 and the short waveform 144. In the step 110 of the algorithm 100 described above the computer system 16 match filters the return signals with the sample of the amplified transmit waveform. However, when the long waveform 142 and the short waveform 144 are included in the amplified transmit waveform the step 110 is preferably modified so that the computer system 16 can discriminate between the features of the long waveform 142 and the short waveform 144 in the demodulated sample of the amplified transmit waveform and the demodulated return signals. The discrimination can be accomplished by using templates indicative of the long waveform 142 and a second template indicative of the short waveform 144. Thus, the match filtering performed by the computer system 16 in the step 110 can match filter the return signals with the sample of the amplified transmit waveform using the first template indicative of the long waveform 142 and the second template indicative of the short waveform 144. By doing so, features in both the blind range 122 and the long range 124 can be clearly identified by the computer system 16 of the radar system 10.

Figure 7:
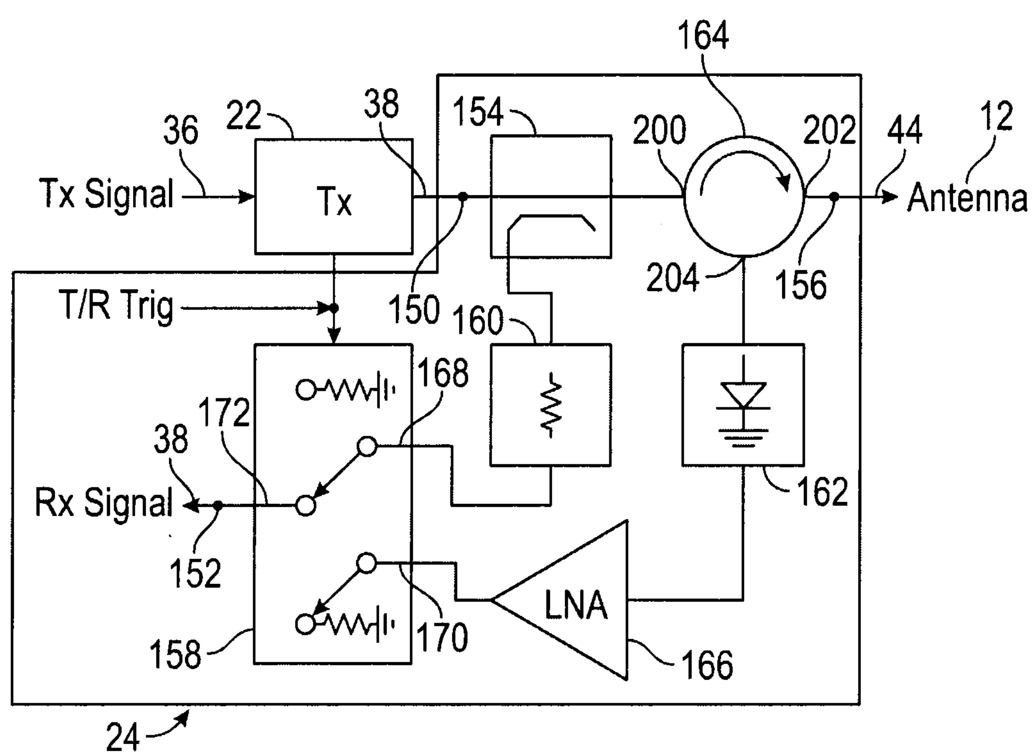
FIG. 7 is a block diagram of a portion of the radar system including a front-end circuit and a transmission amplifier constructed in accordance with the present disclosure.

Referring now to FIG. 7, shown therein is a block diagram of the front end circuit 24 connected to the radar amplifier 22 and the radar antenna 12. The transmitter front end circuit 24 may be provided with a transmitter port 150 to receive the amplified transmit waveform from the radar amplifier 22 and a radar receiver port 152 to transfer the sample of the amplified transmit waveform and the return signals to the microwave transceiver 20 via the communication link 38. As discussed above, the radar amplifier 22 has the low power side 40 receiving the transmit signal having the transmit waveform modulated onto the carrier frequency and the high power side 42 outputting the amplified transmit waveform suitable for transmission to the radar antenna 12.

The front-end circuit 24 may also be provided with a coupler 154, a radar antenna port 156, and a signal director 158. The coupler 154 may be a uni-directional or bi-directional coupler, coupled to the high power side 42 of the radar amplifier 22, used to sample the amplified transmit waveform with minimal disturbance to the communication link 38. The radar antenna port 156 may be configured to receive the return signals from the radar antenna 12 and to direct the return signals to the signal director 158. The radar antenna port 156 may be a coaxial cable connector, for example. The signal director 158 selectively directs the sample of the amplified transmit waveform and the return signals to the radar receiver port 152, which may also be a coaxial cable connector, for example.

The front end circuit 24 may also be provided with an attenuator 160, a limiter circuit 162, a circulator 164, and a low noise amplifier 166. In the embodiment shown, the signal director 158 includes a first input 168, a second input 170, and an output 172. The first input 168 serves to selectively direct the sample of the amplified transmit waveform to the output 172 which is coupled to the radar receiver port 152. The second input 170 is coupled to the radar antenna 12 via the low noise amplifier 166, the limiter circuit 162 and the circulator 164 to receive the return signals from the radar antenna 12 and to selectively direct the return signals to the output 172 which is coupled to the radar receiver port 152.

The attenuator 160 may be coupled to the coupler 154 and the first input 168 and may include an electrical circuit to reduce the magnitude of the sample of the amplified transmit waveform to a level which is suitable for processing by the remainder of the front end circuit 24. The attenuator 160 may be implemented as either a fixed or variable RF attenuator suitable for reducing the power level of the sample of the amplified transmit waveform to level suitable for further processing.

The circulator 164 may be an electronic device which channels signals through specific pathways. In the example shown, the circulator 164 includes three ports 200, 202, and 204. The port 200 is connected to the communication link 38 and receives the amplified transmit waveform from the radar amplifier 22. The port 202 is connected to the communication link 44 and serves to direct the amplified transmit waveform to the radar antenna 12, as well as to receive the return signals from the radar antenna 12. The port 204 is connected to the limiter circuit 162 and serves to direct the return signals to the second input 170 via the limiter circuit 162 and the low noise amplifier 166. In use, the circulator 164 receives the amplified transmit signal on the port 200 and then directs the amplified transmit signal to the port 202 for transmission to the radar antenna 12. During the receive portion 94 of the pulse 79-2, for example, the port 202 receives the return signals and directs the return signals to the port 204 which directs the return signals to the second input 170 via the limiter circuit 162 and the low noise amplifier 166. The limiter circuit 162 serves to protect the remainder of the front end circuit 24 from the high power leakage from the transmitter and the low noise amplifier amplifies the return signals to a magnitude that is usable by the microwave transceiver 20. For example, the low noise amplifier 166 may amplify the return signals by a factor of 20-30 dB.

The signal director 158 is designed to selectively switch either the first input 168 or the second input 170 to the output 172. The switching of the signal director 158 may be controlled by an electrical signal and in the example shown is controlled by the transmit/receive signal on the communication link 66. In one embodiment, the signal director 158 is a single pole double throw switch which provides a high switching speed and a high isolation between the first input 168, the second input 170 and the output 172. For example, the switching speed can be less than 100 ns, and the isolation can be greater than 50 dB.

The microwave transceiver has one down conversion (receiver) channel. In the embodiment shown, the front end circuit 24 facilitates real-time monitoring of the amplified transmit signal on every pulse without adding an additional down conversion channel beyond the one used for the receiver. The signal director 158 uses the down conversion receive channel to monitor the amplified transmit waveform during a time period in which the microwave transceiver 20 would normally be idle. By properly sampling the amplified transmit waveform using the coupler 154, the sample includes all measured amplitude and phase distortion due to the radar amplifier 22 and can therefore be used as feedback including nonlinear pre-distortion. Alternatively, the sample of the amplified transmit waveform can be used as input for a pulse by pulse adaptively matched filter by the computer system 16 in situations where the radar amplifier 22 does not introduce distortion into the amplified transmit waveform. Thus, the signal director 158 allows for precise real-time monitoring of the amplified transmit waveform without adding any significant complexity. It should be noted that the front end circuit 24 may be implemented using coaxial and SMT components.

In certain embodiments, the radar transmitter port 150, the radar receiver port 152, and the radar antenna port 156 may be implemented as any suitable type of conductor or communication link capable of passing the signals described above. In one embodiment, the radar transmitter port 150, the radar receiver port 152, and the radar antenna port 156 may be implemented as coaxial connections.

Figure 8:
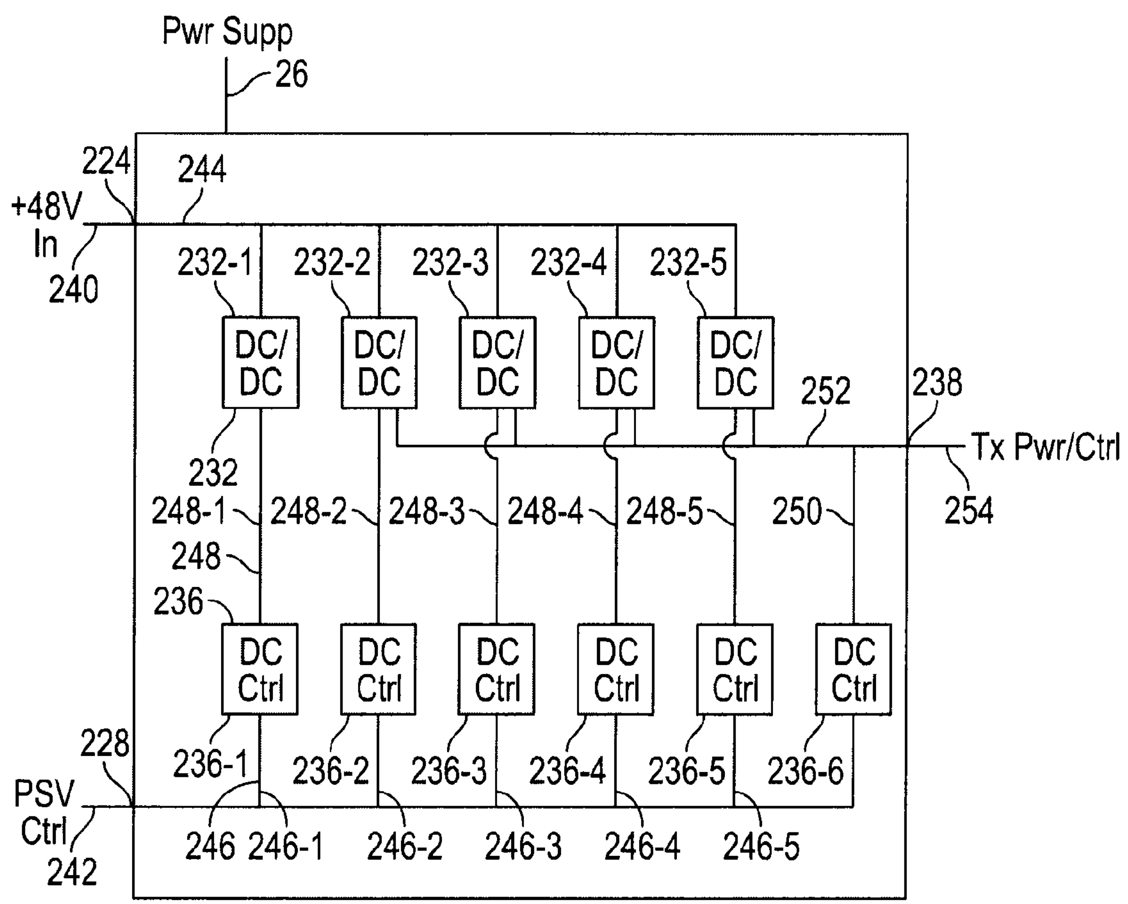
FIG. 8 is a block diagram of an exemplary power controller constructed in accordance with the present disclosure.

Referring to FIG. 8, shown therein is a block diagram of a power supply 26 capable of providing filtered and isolated power to the microwave transceiver 20, the front end circuit 24, and other components of the radar system 10. In addition to supplying power, the power supply 26 may also provide radar control and radar health monitoring functions which may be integrated into the power supply 26. The power supply 26 may be connected to the IF transceiver 18, the microwave transceiver 20, and the front end circuit 24 and be configured to pass control signals 222 and to supply power to at least the radar amplifier 22, the microwave transceiver 20, and the front end circuit 24. In passing the control signals 222, the power supply 26 is configured to condition and pass control signals 222 to the radar amplifier 22, the microwave transceiver 20, and the front end circuit 24 such that the IF transceiver 18 may control operations of the microwave transceiver 20 and cause the front end circuit 24 to sample the amplified transmit waveform.

The power supply 26 may be provided with a DC power input port 224 configured to supply power 226 of a predetermined voltage; a control input port 228 configured to pass a plurality of control signals 222 from the IF transceiver 18 and the computer system 16 to the power supply 26, the microwave transceiver 20, and the front end circuit 24; a plurality of DC/DC power converters 232 receiving power 226 from the DC power input port 224, converting the received power 226 to a plurality of predetermined converted voltages 234, and outputting the plurality of predetermined converted voltages 234 to the microwave transceiver 20, the front end circuit 24, and other components of the radar system 10; one or more control circuitry 236 connected to the control input port 228 and the plurality of DC/DC power converters 232 and configured to cause the plurality of DC/DC power converters 232 to perform predetermined functions specified by the received control signals 222; and a power and control output port 238 configured to receive certain of the plurality of control signals 222 and certain of the plurality of predetermined converted voltages 234 and output certain of the plurality of control signals 222 and certain of the plurality of predetermined converted voltages 234 to the radar amplifier 22, the microwave transceiver 20, the front end circuit 24, and other components of the radar system 10.

The power supply 26 may be implemented on a multi-layer printed circuit board and housed in an enclosure which allows for a main converter of the plurality of DC/DC power converters 232 to be mounted to a base of the housing. The main converter of the plurality of DC/DC power converters 232 may be mounted to the base of the housing such that the base acts as a heat sink for heat transfer or dissipation through the base and the housing.

The DC power input port 224 of the power supply 26 may be connected to a single nominal DC rail providing power to the power supply 26 for distribution to the radar amplifier 22, the microwave transceiver 20, the front end circuit 24, and other components of the radar system 10. In one embodiment, the DC power input port 224 receives power 226 of a predetermined DC voltage in the form of a +48 V (nom) DC voltage from a power cable 240. The DC power input port 224 may be electrically connected to the plurality of independent DC/DC power converters 232 such that the power 226 is passed from the DC power input port 224 to the plurality of independent DC/DC power converters 232. In one embodiment, the plurality of independent DC/DC power converters 232 may be connected in parallel to the DC power input port 224.

The control input port 228 may receive the plurality of control signals 222 from the IF transceiver 18 and the computer system 16 via a cable connection 242. The plurality of control signals 222 may be on/off signals for the plurality of DC/DC power converters 232, on/off signals for the microwave transceiver 20, on/off signals for the front end circuit 24, switch signals for the front end circuit 24, pulse signals for the microwave transceiver 20 or front end circuit 24, on/off signals for the radar amplifier 22, on/off signals for the low noise amplifier 166, combinations thereof, or the like. Certain of the plurality of control signals 222 may be transmitted by the IF transceiver 18, for example, the switch signals. Certain other of the plurality of control signals 222 may be transmitted by the computer system 16, such as on/off signals for the plurality of DC/DC power converters 232, on/off signals for the microwave transceiver 20, or on/off signals for the front end circuit 24, for instance. In one embodiment, certain of the plurality of control signals 222, sent from the computer system 16, may be used to power down certain of the plurality of DC/DC power converters 232, thereby powering down components of the radar system 10 which draw power from the plurality of DC/DC power converters 232, such as the microwave transceiver 20, the front end circuit 24, the radar amplifier 22, and the low noise amplifier 166, for example. The plurality of control signals 222 may be in the form of low-voltage differential signals, single ended signals, transistor-transistor logic signals, or any other suitable control signals.

The one or more control circuitry 236 may be implemented as connected to the control input port 228 via line 246 and connected to the plurality of DC/DC power converters 232 via line 248. The one or more control circuitry 236 may condition and transmit certain of the plurality of control signals 222 such that they may be interpreted by the plurality of DC/DC power converters 232. The one or more control circuitry 236 may also be connected to the power and control output port 238, and configured to condition and transmit certain of the plurality of control signals 222 to be received and processed by the microwave transceiver 20, the front end circuit 24, and other components of the radar system 10, for example. In one embodiment, where the plurality of control signals 222 for the front end circuit 24 are low-voltage differential signals, the one or more control circuitry 236 may translate the signals into single ended signals capable of being received by the front end circuit 24, for example.

As shown in FIG. 8, control circuitry 236-1-236-6 may be provided, with control circuitry 236-1-236-5 connected to DC/DC power converters 232-1-232-5, respectively via lines 248-1-248-5, and control circuitry 236-6 connected to the power and control output port 238, via line 250. In this embodiment, the control circuitry 236-6 acts as conditioning circuitry which receives, conditions, and transmits control signals for the components of the radar system 10 receiving power and control signals from the power supply 26, such as the microwave transceiver 20 and the front end circuit 24, for example. The control circuitry 236-1-236-5 receive, condition, and transmit the control signals to the plurality of DC/DC power converters 232-1-232-5, respectively. In another embodiment, the one or more control circuitry 236 may be connected to a bypass port, allowing for manual control of the plurality of DC/DC power converters 232 and/or the components of the radar system 10 drawing power and control signals through the power supply 26.

The plurality of DC/DC power converters 232 may be electrically connected to the DC power input port 224 via line 244, and certain of the DC/DC power converters 232 may be connected to the power and control output port 238 via line 252. The plurality of DC/DC power converters 232 may be connected in parallel to the DC power input port 224. The plurality of DC/DC power converters 232 may receive the power 226 from the DC power input port 224 and provide isolated output power in the form of the plurality of predetermined converted voltages 234. The power 226 supplied to the plurality of DC/DC power converters 232 may be converted to by the plurality of DC/DC power converters to the plurality of predetermined converted voltages 234 being suitable voltages to power components of the radar system 10. In one embodiment, the plurality of predetermined converted voltages 234 may be chosen from the group comprising +12V, +10V, +8V, +5V, and −5V, for example. The plurality of DC/DC power converters 232 may also be electrically connected to the one or more control circuitry 236, as discussed above. The plurality of DC/DC power converters 232 may also receive certain of the plurality of control signals 222 through the one or more control circuitry 236, via line 248.

In one embodiment, the plurality of DC/DC power converters 232 may be connected to a main DC/DC power converter through which the DC power input port 224 may supply the power 226 to the plurality of DC/DC power converters 232. In this embodiment, the main DC/DC power converter 232 may serve as a supply bottle neck for the power supply 26 and provide a failsafe point at which power to the power supply 26 may be terminated, thereby terminating power to the components of the radar system 10 receiving power from the power supply 26. The main DC/DC power converter may also allow the power supply 26 to function while the plurality of DC/DC power converters 232 are not in operation, such that a health monitoring interface may remain in operation without regard to the operation of the plurality of DC/DC power converters 232.

The power and control output port 238 is configured to receive certain of the plurality of control signals 222 and certain of the plurality of predetermined converted voltages 234. As previously discussed, the power and control output port 238 may be connected to certain of the plurality of DC/DC power converters 232 via line 252 and to the one or more control circuitry 236 via line 250. The power and control output port 238 may be connected to the microwave transceiver 20, the front end circuit 24, the radar amplifier 22, the low noise amplifier 166, and other components of the radar system 10 via a multi-pin cable 254, carrying certain of the plurality of predetermined converted voltages 234 and certain of the plurality of control signals 222.

In one embodiment, the power supply 26 may also be provided with one or more auxiliary ports configured to interact with one or more auxiliary instruments or sensors, one or more manual control switch configured to switch off power to the power supply 26, one or more monitor circuitry configured to receive signals indicative of functional elements of the power supply 26, and an interlock port configured to serve as a failsafe cutoff for the power supply 26. The one or more monitor circuitry may be configured with a monitor port electrically connected to the DC power input port 224, the plurality of DC/DC power converters 232, and/or the one or more control circuitry 236 capable of outputting one or more signals indicative of the operation of the components connected to the monitor circuitry through the monitor port via a cabling. The one or more monitor circuitry may also be configured as a digital monitor electrically connected to the DC power input port 224, the plurality of DC/DC power converters 232, and/or the one or more control circuitry 236 capable of outputting one or more signals indicative of the operation of the components connected to the monitor circuitry via wired or wireless transmitter circuitry within the monitor circuitry.

Figure 9:
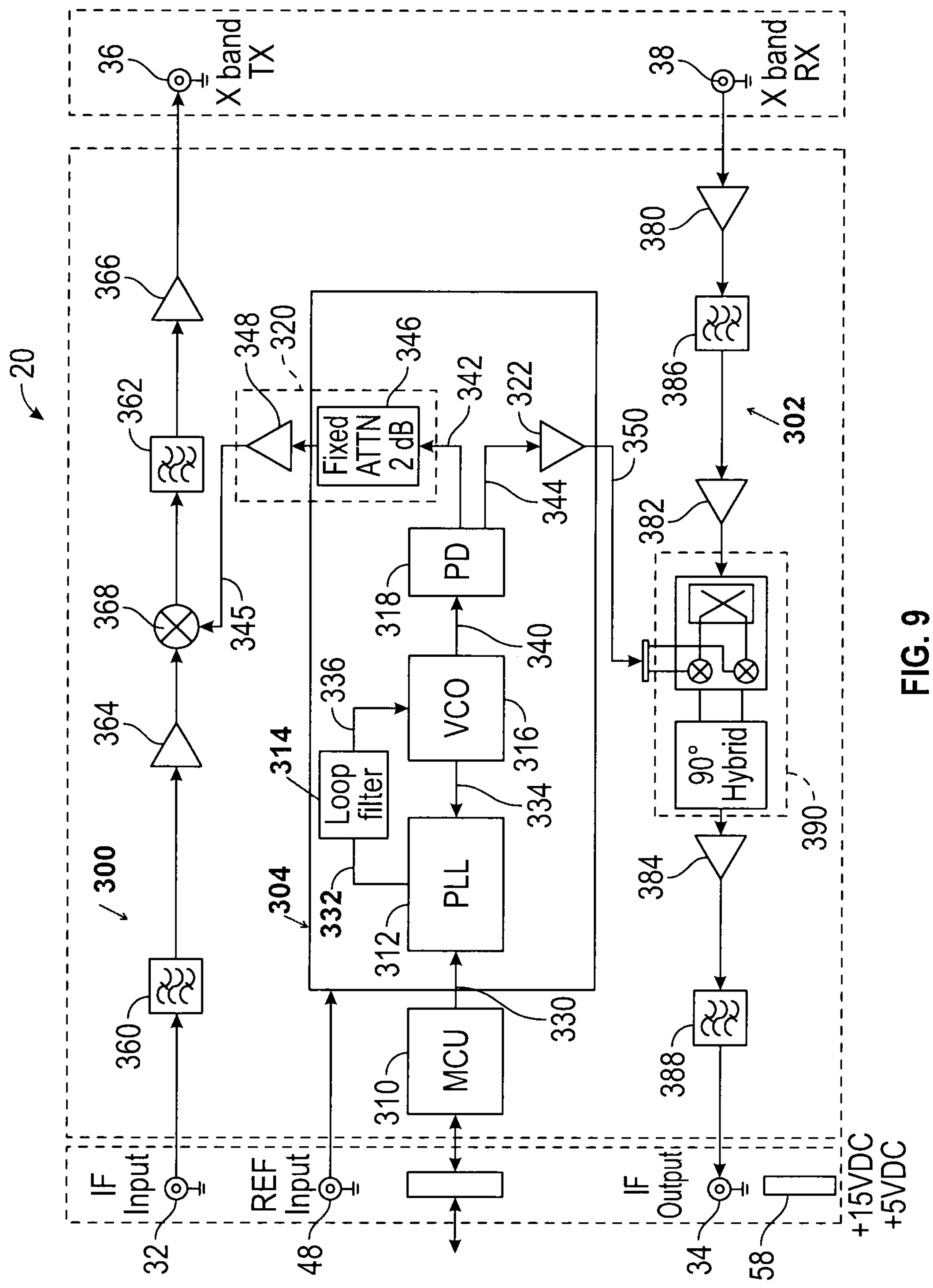
FIG. 9 is a block diagram of an exemplary microwave transceiver constructed in accordance with the present disclosure.

Referring now to FIG. 9, shown therein is a schematic diagram of one embodiment of the microwave transceiver 20 that modulates the transmit waveform onto the carrier frequency to generate the transmit signal and also uses the carrier frequency to demodulate the sample of the amplified transmit waveform as well as to demodulate the return waveform from a return signal generated by the radar antenna 12. In the embodiment shown in FIG. 9, the microwave transceiver 20 does not discriminate between signals received from the communication link 38. However, it should be understood that the microwave transceiver 20 may be configured to discriminate between different types of signals. For example, the demodulated sample of the amplified transmit waveform may be output on a different signal path than the demodulated return waveform from the return signals generated by the radar antenna 12. In general, the microwave transceiver 20 is provided with a transmission circuit 300, a receive circuit 302 and an oscillation circuit 304.

The transmission circuit 300 receives the transmit waveform by the communication link 32 from the IF transceiver 18 and modulates the transmit waveform onto the carrier frequency to generate the transmit signal. The transmission circuit 300 may also amplify the transmit signal and direct the transmit signal onto the communication link 36 for reception by the radar amplifier 22.

The receive circuit 302 receives the sample of the amplified transmit waveform as well as the return signals from the communication link 38. The receive circuit 302 serves to demodulate the sample of the amplified transmit waveform as well as the return signals using the carrier frequency and directs the signals and/or waveforms generated thereby to the communication link 34 so that such signals can be processed by the IF transceiver 18 and the computer system 16 as discussed above.

The oscillation circuit 304 generates the carrier frequency that is used to modulate the transmit waveform as well as to demodulate the sample of the amplified transmit waveform as well as the return signals. The oscillation circuit 304 may be adapted to generate the carrier frequency in a variety of manners and having a variety of selected frequency or frequency ranges. In general, the oscillation circuit 304 may be provided with a microcontroller 310, a phase locked loop synthesizer circuit 312, a loop filter circuit 314, a voltage controlled oscillator circuit 316, a power divider 318, a transmit power converter circuit 320 and a receive power converter circuit 322.

The microcontroller 310 may be interfaced with the computer system 16, the IF transceiver 18 and/or another computer system or controller and is used to permit the user to select the carrier frequency of the transmit signal. The microcontroller 310 receives user input indicative of the desired carrier frequency and then transmits suitable control signals to the phase locked loop synthesizer circuit 312 via a communication link 330.

The phase locked loop synthesizer circuit 312, loop filter circuit 314 and the voltage controlled oscillator circuit 315 communicate via communication links 332, 334 and 336. The phase locked loop synthesizer circuit 312, loop filter circuit 314 form a control system in which the voltage controlled oscillator circuit 316 generates an output signal directed to the phase locked loop synthesizer circuit 312 via the communication link 334 and whose phase is related to an expected phase known by the phase locked loop synthesizer circuit 312. The phase locked loop synthesizer circuit 312 compares the output signal of the voltage controlled oscillator circuit 316 to its desired phase, and then outputs a feedback signal to the voltage controlled oscillator circuit 316 via the signal connection 332, loop filter circuit 314 and the signal connection 336. The voltage controlled oscillator circuit 316 receives the feedback signal and then adjusts the frequency of the output signal accordingly, e.g., to keep the phases matched. This causes the voltage controlled oscillator circuit 316 to generate a signal oscillating at the carrier frequency, which is output to the power divider 318 via a signal connection 340. The power divider 318 splits the power of the signal and directs a portion of the power of the signal to the transmit power converter circuit 320 via a signal connection 342 and another portion of the power to the receive power converter circuit 322 via a signal connection 344.

The transmit power converter circuit 320 receives the portion of the signal via the signal connection 342 and then adjusts the power level of the signal to be suitable for the transmission circuit 300 and then outputs the signal having the carrier frequency onto a signal connection 345. As shown in FIG. 9, the transmit power converter circuit 320 may be implemented with an attenuator 346 coupled to an amplifier 348 having a gain of approximately 13.5 dB, for example. However, it should be understood that the transmit power converter circuit 320 can be implemented in other manners.

The receive power converter circuit 322 receives the portion of the signal via the signal connection 344 and then adjusts the power level of the signal to be suitable for the receive circuit 302 and then outputs the signal having the carrier frequency onto a communication link 350. As shown in FIG. 9, the receive power converter circuit 322 may be implemented with an amplifier having a gain of approximately 17 dB. However, it should be understood that the receive power converter circuit 322 can be implemented in other manners.

The transmission circuit 300 may be provided with a first filter 360, the second filter 362, a first amplifier 364, a second amplifier 366 and a transmit mixer 368. The first filter 360 receives the transmit waveform via the communication link 32 and removes any distortion introduced into the transmit waveform by the IF transceiver 18. As will be understood by one skilled in the art, when the signal is filtered the magnitude of the signal is reduced and for this reason the first amplifier 364 serves to boost the energy of the transmit waveform to a level which falls within a linear region of the mixer 368. The transmit mixer 368 receives the transmit waveform from the first amplifier 364 and the carrier frequency from the communication link 345 and then modulates the transmit waveform into the carrier frequency to form the transmit signal discussed above. The transmit signal is output by the transmit mixer 368 to the second filter 362 which serves to remove distortion from the transmit signal that was introduced by the transmit mixer 368. The second filter 362 is coupled to the second amplifier 366 which serves to boost the transmit signal to a level suitable for transmission to the radar amplifier 22.

The receive circuit 302 may be provided with a first amplifier 380, a second amplifier 382, a third amplifier 384, a first filter 386, a second filter 388, and a receive mixer 390. The first amplifier 380 receives the sample of the amplified transmit waveform and the return signals (which may be collectively referred to herein as "receive signals") and then amplifies the receive signals to a level suitable for the modulation by the receive mixer 390. Receive signals are then directed through the first filter 386 where distortion introduced into the receive signals by the first amplifier 380 is removed. The receive signals are then directed to the second amplifier 382 to boost the receive signals to a level matching input requirements of the receive mixer 390.

The receive mixer 390 receives and demodulates the receive signals with the carrier frequency received via the signal connection 352 to provide the demodulated sample of the amplified transmit waveform and the demodulated return signals indicative of echoes from microwave radiation created by the amplified transmit waveform (collectively referred to herein as "demodulated signals"). The receive mixer 390 may be an image rejection mixer configured to mitigate image distortions. The demodulated signals are then directed to the IF transceiver 18 via the third amplifier 384 and the second filter 388 which serves to boost the signal level and also remove distortions introduced by the receive mixer 390.

Figure 10:
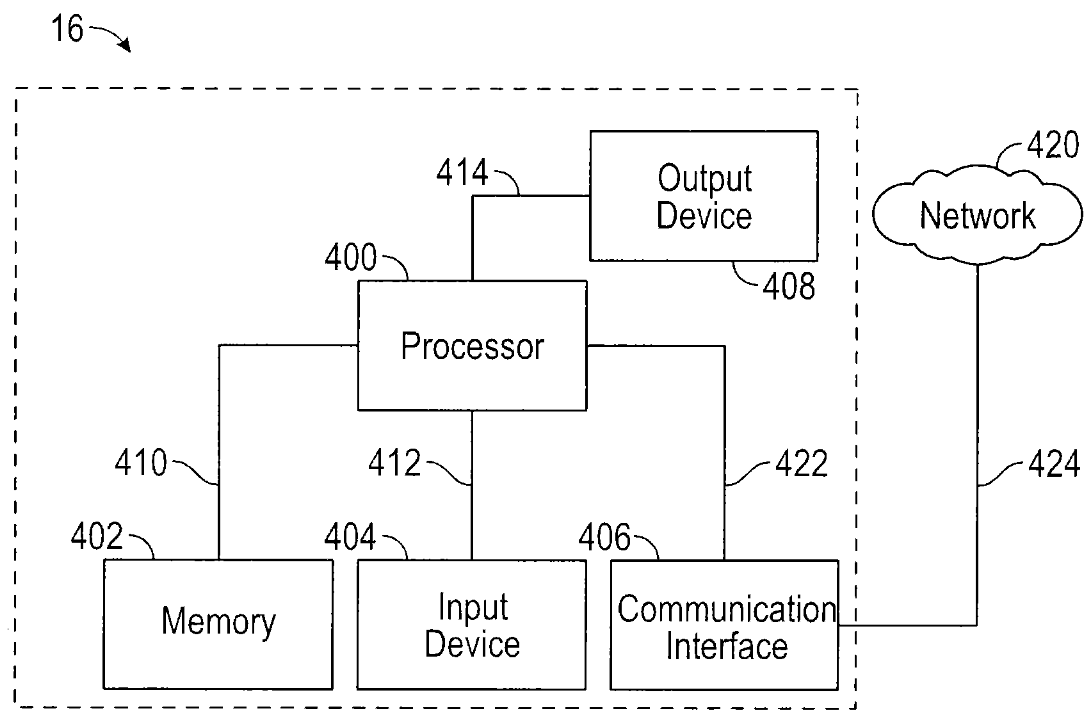
FIG. 10 is a block diagram of an exemplary computer system constructed in accordance with the present disclosure.

As shown in FIG. 10, the computer system 16 has a processor 400 which is configured to execute processor executable code, one or more memory 402 capable of storing processor executable code, an input device 404, and one or more communication interface 406, and an output device 408. The computer system 16 can be partially or completely network-based or cloud-based, and is not necessarily located in a single physical location.

The processor 400 can be implemented as a single or multiple processors working together to execute the logic described herein. Exemplary embodiments of the processor 400 include a digital signal processor (DSP), a central processing unit (CPU), a field programmable gate array (FPGA), a microprocessor, a multi-core processor, and combinations thereof. The processor 400 is capable of communicating with the one or more memories 402 via a path 410 which can be implemented as a data bus, for example. The processor 400 is capable of communicating with the input device 404 and the output device 408 via paths 412 and 414, respectively. Paths 412 and 414 may be implemented similarly to, or differently from, path 410. The processor 400 may be further capable of interfacing and/or communicating with one or more user terminals (not shown) via a network 420 via the one or more communication interface 406 and paths 422 and 424, such as by exchanging electronic, digital and/or optical signals via one or more physical or virtual ports using a network protocol such as TCP/IP, for example. It is to be understood that in certain embodiments when the processor 400 includes more than one processor, such processors may be located remotely from one another, located in the same location, or comprising a unitary multi-core processor (not shown). The processor 400 is capable of reading and/or executing processor executable code and/or of creating, manipulating, altering, and storing computer data structures into the one or more memory 402.

The one or more memory 402 stores processor executable code and may be implemented as non-transient memory, such as random access memory (RAM), a CD-ROM, a hard drive, a solid state drive, a flash drive, a memory card, a DVD-ROM, a floppy disk, an optical drive, and combinations thereof, for example. It is to be understood that while one or more memory 402 is shown located in the same physical location as the computer system 16, the one or more memory 402 may be located remotely from the computer system 16 and may communicate with the processor 400 via the network 420. Additionally, when more than one memory 402 is used, one or more memory 402 may be located in the same physical location as the computer system 16, and one or more memory 402 may be located in a remote physical location from the computer system 16. The physical location(s) of the one or more memory 402 can be varied, and the one or more memory 402 may be implemented as a "cloud memory" i.e., one or more memory 402 which is partially, or completely based on, or accessed using the network 420.

The input device 404 transmits data to the processor 400, and can be implemented as a keyboard, a mouse, a touchscreen, a camera, a cellular phone, a tablet, a smart phone, a PDA, a microphone, a network adapter, and combinations thereof, for example. The input device 404 may be located in the same physical location as the computer system 16, or may be remotely located and/or partially or completely network-based. The input device 404 communicates with the processor 400 via the path 412 which, as discussed above may be a data bus.

The output device 408 transmits information from the processor 400 to a user, such that the information can be perceived by the user. For example, the output device 408 can be implemented as a server, a computer monitor, a cell phone, a tablet, a speaker, a website, a PDA, a fax, a printer, a projector, a laptop monitor, and combinations thereof. The output device 408 can be physically co-located with the computer system 16, or can be located remotely from the computer system 16, and may be partially or completely network based (e.g., a website hosted by one or more servers and accessible via the Internet using HTML, XHTML, secure HTML and/or TCP/IP, for example). The output device 408 communicates with the processor 400 via the path 414.

The network 420 preferably permits bi-directional communication of information and/or data between the computer system 16 and one or more user terminals and/or other devices (not shown). The network 420 may interface with the computer system 16 in a variety of ways, such as by optical and/or electronic interfaces, and may use a plurality of network topographies and protocols, such as Ethernet, TCP/IP, circuit switched paths, and combinations thereof, for example. For example, the network 420 can be implemented as the World Wide Web (or Internet), a local area network (LAN), a wide area network (WAN), a metropolitan network, a wireless network, a cellular network, a GSM-network, a CDMA network, a 3G network, a 4G network, a satellite network, a radio network, an optical network, a cable network, a public switched telephone network, an Ethernet network, and combinations thereof, and may use a variety of network protocols to permit bi-directional interface and communication of data and/or information between the processor 400 and the network 420.

Figure 11:
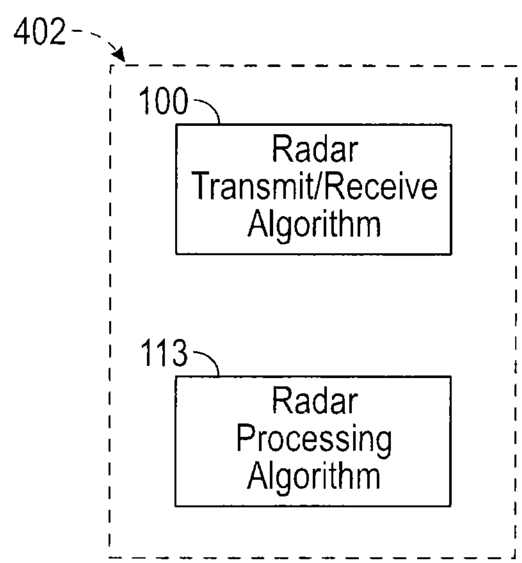
FIG. 11 is a block diagram of an exemplary memory of the computer system storing a transmit/receive algorithm and a radar processing algorithm in accordance with the present disclosure.

Referring now to FIG. 11, the one or more memory 402 may be referred to herein as a "non-transient computer readable medium" and preferably stores processor executable code and/or information comprising the radar transmit/receive algorithm 100, and the radar processing algorithm 113. The processor executable code may be written in any suitable programming language, such as C++, for example. The radar transmit/receive algorithm 100, and the radar processing algorithm 113 can be stored as a data structure. In an alternative embodiment, the logic described above with respect to the processor 400, the radar transmit/receive algorithm 100, and the radar processing algorithm 113 may be executed by hardware such as an application specific integrated circuit or field programmable gate array.

While the presently disclosed inventive concepts have been described in connection with the exemplary embodiments of the various figures, they are not limited thereto and it is to be understood that other similar embodiments may be used or modifications and additions may be made to the described embodiments for performing the same function of the presently disclosed inventive concepts without deviating therefrom. Therefore, the presently disclosed inventive concepts should not be limited to any single embodiment, but rather should be construed in breadth and scope in accordance with the appended claims. Also, the appended claims should be construed to include other variants and embodiments of the presently disclosed inventive concepts, which may be made by those skilled in the art without departing from the true spirit and scope thereof.

From the above description, it is clear that the inventive concepts disclosed herein are well adapted to carry out the objects and to attain the advantages mentioned herein as well as those inherent in the inventive concepts disclosed herein. While exemplary embodiments of the inventive concepts disclosed herein have been described for purposes of this disclosure, it will be understood that numerous changes may be made which will readily suggest themselves to those skilled in the art and which are accomplished within the scope of the inventive concepts disclosed and as defined in the appended claims.

What is claimed is:

1. A microwave transceiver for a radar system, comprising:
- a voltage controlled oscillator configured to generate a carrier frequency;
- a loop filter circuit electrically coupled to the voltage controlled oscillator;
- a phase locked loop synthesizer circuit electrically coupled to the voltage controlled oscillator and the loop filter circuit, the phase locked loop circuit configured to receive an input signal from the voltage controlled oscillator and to provide an output signal to the voltage controlled oscillator through the loop filter circuit to lock the output of the voltage controlled oscillator to the carrier frequency;
- a transmit mixer receiving the carrier frequency and modulating a transmit waveform onto the carrier frequency to generate a transmit signal; and
- a receive mixer receiving the carrier frequency and using the carrier frequency to demodulate a receive waveform from a return signal generated by a radar antenna.

2. The radio frequency transceiver of claim 1, further comprising a power divider electrically coupled to the voltage controlled oscillator and configured to selectively transmit the carrier frequency to the transmit mixer and the receive mixer.

3. The radio frequency transceiver of claim 1, wherein the receive mixer is defined further as an image rejection mixer adapted to cancel image distortion to provide demodulated receive signals.

4. A transmitter front end circuit, comprising:
- a radar transmitter port;
- a radar receiver port;
- a radar amplifier having a low power side receiving a transmit signal having a transmit waveform modulated onto a carrier frequency from the radar transmitter port, and a high power side outputting an amplified transmit waveform to the radar transmitter port, the amplified transmit waveform suitable for transmission to a radar antenna;

a coupler coupled to the high power side of the radar amplifier to sample the amplified transmit waveform;

a radar antenna port configured to receive return signals from the radar antenna; and a signal director selectively directing the sample of the amplified transmit waveform and the return signals to the radar receiver port.

5. The transmitter front end circuit of claim 4, wherein the signal director includes a switch circuit having a first input port connected to the coupler and a second input port connected to the radar antenna input.

6. The transmitter front end circuit of claim 5, wherein the amplified transmit waveform has a frequency range suitable to cause the radar antenna to emit microwave energy in an X-band range.

7. The transmitter front end circuit of claim 5, wherein the radar antenna input includes a limiter circuit coupled to the radar antenna, and a reception amplifier coupled between the limiter circuit and the signal director.

8. The transmitter front end circuit of claim 7, wherein the reception amplifier is configured to receive the return signals and amplify the return signals at least 20 dB.

9. The transmitter front end circuit of claim 4, further comprising an attenuator circuit coupled between the coupler and the signal director, the attenuator circuit configured to attenuate the sample of the amplified transmit waveform.

10. A non-transitory computer readable medium storing processor executable code that when executed by one or more processors cause the one or more processors to:

direct a transmit pulse having a transmit waveform to the one or more communication interfaces, receive from the one or more communication interfaces (a) a demodulated sample of an amplified transmit waveform taken from a high power side of a radar transmitter, (b) demodulated return signals indicative of echoes from microwave radiation created by the amplified transmit waveform, and match filter the demodulated return signals with the demodulated sample of the amplified transmit waveform.

11. The non-transitory computer readable medium of claim 10, wherein the transmit waveform of the transmit pulse includes a series of numbers in a digital format.

12. The non-transitory computer readable medium of claim 10, wherein the demodulated sample of the amplified transmit waveform and the demodulated return signals are received from the one or more communication interfaces in a time domain format, and wherein the one or more processors execute processor executable code stored on at least one non-transitory computer readable medium to convert the demodulated sample of the amplified transmit waveform and the demodulated return signals into a frequency domain format prior to the one or more processors match filtering the demodulated return signals with the demodulated sample of the amplified transmit waveform.

13. The non-transitory computer readable medium of claim 10, wherein the one or more processors executing processor executable code stored on the at least one non-transitory computer readable medium process a radar signal having information generated by the match filtering of the demodulated return signals with a demodulated sample of the amplified transmit waveform with a radar processing algorithm to convert the information into a meteorological data showing one or more features within the Earth's atmosphere.

14. The non-transitory computer readable medium of claim 10, wherein the transmit waveform includes a long waveform and a short waveform occupying separate periods in a time domain, and wherein the one or more processors execute processor executable code stored on the at least one non-transitory computer readable medium to match filter the demodulated return signals with the demodulated sample of the amplified transmit waveform using a first template indicative of the long waveform, and a second template indicative of the short waveform.

15. A power controller for pulse compression weather radar, comprising:

a DC power input port configured to supply power of a predetermined DC voltage;

a control input port configured to supply a plurality of control signals;

a plurality of DC/DC power converters receiving power from the DC power input port, the plurality of DC/DC power converters configured to convert the predetermined DC voltage received from the DC power input port to a plurality of predetermined converted voltages and configured to receive certain of the plurality of control signals from the control input port;

one or more control circuits connected to the control input port and the plurality of DC/DC power converters and configured to receive certain of the plurality of control signals and cause the plurality of DC/DC power converters to perform predetermined functions specified by the control signals received by the one or more control circuits; and a power and control output configured to receive certain of the plurality of control signals and certain of the plurality of predetermined converted voltages.

16. The power controller of claim 15, wherein at least one of the control signals is a transmit/receive signal synchronized with a transmission of a transmit waveform directed to a radar amplifier.

17. The power controller of claim 16, wherein the plurality of predetermined converted voltages are chosen from the group comprising, +12V, +10V, +8V, +5V, and −5V.

18. The power controller of claim 15, further comprising one or more conditioning circuitry configured to condition certain of the plurality of control signals and wherein certain of the plurality of control signals are converted from differential signals to single ended signals.

* * * * *